(12) United States Patent
Lin et al.

(10) Patent No.: US 12,342,373 B2
(45) Date of Patent: Jun. 24, 2025

(54) WIRELESS COMMUNICATION METHODS, USER EQUIPMENT AND NETWORK DEVICE

(71) Applicant: GUANGDONG OPPO MOBILE TELECOMMUNICATIONS CORP., LTD., Guangdong (CN)

(72) Inventors: Hao Lin, Neuilly-sur-Seine (FR); Zuomin Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 372 days.

(21) Appl. No.: 17/742,405

(22) Filed: May 12, 2022

(65) Prior Publication Data
US 2022/0272755 A1    Aug. 25, 2022

Related U.S. Application Data

(63) Continuation of application No. PCT/CN2020/129486, filed on Nov. 17, 2020.
(Continued)

(51) Int. Cl.
*H04W 74/08* (2024.01)
*H04W 72/04* (2023.01)
(Continued)

(52) U.S. Cl.
CPC ..... *H04W 74/0816* (2013.01); *H04W 72/044* (2013.01); *H04W 74/0866* (2013.01)

(58) Field of Classification Search
CPC ........... H04W 74/0816; H04W 72/044; H04W 74/0866; H04W 72/0453; H04W 74/008; H04W 74/006; H04W 74/0808
See application file for complete search history.

(56) References Cited

U.S. PATENT DOCUMENTS

2019/0141734 A1   5/2019  Lei et al.
2019/0229967 A1*  7/2019  Frank ................... H04W 72/21
(Continued)

FOREIGN PATENT DOCUMENTS

CN          109560842       4/2019

OTHER PUBLICATIONS

"Office Action of China Counterpart Application, Application No. 202210826128.8", with English translation thereof, issued on Oct. 7, 2023, p. 1-p. 13.
(Continued)

*Primary Examiner* — Luat Phung
(74) *Attorney, Agent, or Firm* — Hodgson Russ LLP

(57) ABSTRACT

The present disclosure provides a wireless communication method applied in a User Equipment (UE). The method includes: obtaining a first indication from a network device, the first indication being used for indicating a transmission mode; and determining the transmission mode based on the first indication. The transmission mode is used for communications between the network device and the UE, and is a first transmission mode or a second transmission mode. In the first transmission mode, the network device performs transmission in a Bandwidth Part (BWP) including a plurality of BWP parts, to which Listen Before Talk (LBT) is to be applied, after an entirety of the BWP has passed Clear Channel Assessment (CCA). In the second transmission mode, the network device performs transmission in one or more BWP parts of the plurality of BWP parts that have passed CCA.

14 Claims, 6 Drawing Sheets

Determine the transmission mode based on the search space configuration — 210

120

Related U.S. Application Data

(60) Provisional application No. 62/936,940, filed on Nov. 18, 2019.

(51) Int. Cl.
*H04W 72/044* (2023.01)
*H04W 74/0816* (2024.01)

(56) References Cited

U.S. PATENT DOCUMENTS

| | | | |
|---|---|---|---|
| 2019/0253230 A1 | 8/2019 | Loehr et al. | |
| 2019/0313348 A1* | 10/2019 | MolavianJazi | H04W 52/365 |
| 2020/0052828 A1* | 2/2020 | Wang | H04L 1/188 |
| 2020/0178353 A1* | 6/2020 | Yang | H04W 52/02 |
| 2020/0260487 A1* | 8/2020 | Bhattad | H04W 74/0808 |
| 2020/0267760 A1* | 8/2020 | Bhattad | H04L 5/008 |
| 2020/0280524 A1* | 9/2020 | Guo | H04L 5/0048 |
| 2020/0305169 A1* | 9/2020 | Loehr | H04W 4/40 |
| 2020/0314816 A1* | 10/2020 | Yi | H04L 5/0094 |
| 2021/0168809 A1* | 6/2021 | Sun | H04W 52/0229 |
| 2021/0345304 A1* | 11/2021 | Munier | H04W 72/23 |
| 2022/0322349 A1* | 10/2022 | Kim | H04W 74/0808 |

OTHER PUBLICATIONS

Lg Electronics, "Summary on frame structure for NR-U", 3GPP TSG RAN WG1 Meeting #95 R1-1813928, Nov. 13, 2018, pp. 1-18.

"Search Report of of counterpart Europe application No. 20889254.7", issued on Nov. 22, 2022, p. 1-p. 11.

"Office Action of China Counterpart Application, Application No. 202210826128.8", with English translation thereof, Issued on Jul. 19, 2023, p. 1-p. 14.

Sharp, "Frame structures for NR unlicensed operation", 3GPP TSG RAN WG1 Meeting #95 R1-1813203, Nov. 2018, pp. 1-7.

VIVO, "Discussion on wideband operation in NR-U", 3GPP TSG RAN WG1#96bis R1-1904069, Apr. 2019, pp. 1-5.

Ericsson, "Wideband operation for NR-U", 3GPP TSG-RAN WG1 Meeting #98 R1-1909302, Aug. 2019, pp. 1-10.

"International Search Report (Form PCT/ISA/210) of PCT/CN2020/129486," mailed on Feb. 20, 2021, pp. 1-4.

"Written Opinion of the International Searching Authority (Form PCT/ISA/237) of PCT/CN2020/129486," mailed on Feb. 20, 2021, pp. 1-4.

\* cited by examiner

WIRELESS COMMUNICATION METHODS, USER EQUIPMENT AND NETWORK DEVICE

CROSS-REFERENCE TO RELATED APPLICATION

This application is a continuation of international application of PCT application serial no. PCT/CN2020/129486 filed on Nov. 17, 2020, which claims the priority benefit of U.S. provisional application Ser. No. 62/936,940, filed on Nov. 18, 2019. The entirety of each of the above mentioned patent applications is hereby incorporated by reference herein and made a part of this specification.

BACKGROUND

Technical Field

The present disclosure relates to communication technology, and more particularly, to wireless communication methods and the associated User Equipment (UE) and network device.

Description of Related Art

An unlicensed spectrum is a shared spectrum that may be used for communication in a wireless communication network. Communication devices in different communication systems can use the spectrum as long as they meet regulatory requirements set by a country or a region on the spectrum, and do not need to apply for a proprietary spectrum authorization from a government.

In order to allow various communication systems that use an unlicensed spectrum for wireless communication to coexist friendly in the spectrum, some countries or regions specify regulatory requirements that must be met to use the unlicensed spectrum. For example, a communication device follows a principle of "Listen Before Talk (LBT)". As a channel access scheme, LBT lies in that the communication device needs to perform channel sensing before transmitting a signal on a channel. Only when an outcome of the LBT shows that the channel is idle, the communication device can perform signal transmission; otherwise, the communication device cannot perform signal transmission. In order to ensure fairness, once a device successfully occupies a channel, a transmission duration cannot exceed the Maximum Channel Occupancy Time (MCOT).

On an unlicensed spectrum or carrier, for a channel occupation time obtained by a base station, it may share the channel occupation time to a User Equipment (UE) for transmitting an uplink signal or uplink channel. In other words, when the base station shares its own channel occupancy time with the UE, the UE can use an LBT mode with a higher priority than that used by the UE itself to obtain the channel, thereby obtaining the channel with a greater probability.

In a wideband system, a network device can configure an active Bandwidth part (BWP) which contains more than one LBT bandwidth (each LBT bandwidth is 20 MHz). As well-known, a BWP may be divided into a plurality of parts (called as BWP parts), each of which may be considered as a Resource Unit (RB) set. In view of this, the term "LBT bandwidth" can be construed as a BWP part or an RB set, to which LBT is to be applied. Then, the network device can further decide transmission modes. There are at least two transmission modes to operate in the wideband system. These transmission modes will lead to different UE behaviors and the network device can configure these transmission modes according to the network capability.

SUMMARY

It has been agreed that at least two transmission modes can be used in communications between a network device and a User Equipment (UE).

However, how to inform the UE of which one transmission mode is used in an efficient way is still an open problem.

It is an object of the present disclosure to provide wireless communication methods and the associated UE and network device, capable of solving or mitigating the above problem.

According to a first aspect of the present disclosure, a wireless communication method applied in a UE is provided. The method includes: obtaining a first indication from a network device, the first indication being used for indicating a transmission mode; and determining the transmission mode based on the first indication. The transmission mode is used for communications between the network device and the UE, and is a first transmission mode or a second transmission mode. In the first transmission mode, the network device performs transmission in a Bandwidth Part (BWP) including a plurality of BWP parts, to which Listen Before Talk (LBT) is to be applied, after an entirety of the BWP has passed Clear Channel Assessment (CCA). In the second transmission mode, the network device performs transmission in one or more BWP parts of the plurality of BWP parts that have passed CCA.

According to a second aspect of the present disclosure, a wireless communication method applied in a network device is provided. The method includes: transmitting a first indication to a User Equipment (UE). The first indication is used for indicating a transmission mode. The transmission mode is used for communications between the network device and the UE. The transmission mode is a first transmission mode or a second transmission mode. In the first transmission mode, the network device performs transmission in a BWP including a plurality of BWP parts, to which LBT is to be applied, after an entirety of the BWP has passed CCA. In the second transmission mode, the network device performs transmission in one or more BWP parts of the plurality of BWP parts that have passed CCA.

According to a third aspect of the present disclosure, a UE is provided. The UE includes: a communication unit configured to obtain a first indication from a network device, the first indication being used for indicating a transmission mode; and a processing unit configured to determine the transmission mode based on the first indication, the transmission mode being used for communications between the network device and the UE, and the transmission mode being a first transmission mode or a second transmission mode. In the first transmission mode, the network device performs transmission in a BWP including a plurality of BWP parts, to which LBT is to be applied, after an entirety of the BWP has passed CCA. In the second transmission mode, the network device performs transmission in one or more BWP parts of the plurality of BWP parts that have passed CCA.

According to a fourth aspect of the present disclosure, a network device is provided. The network device includes: a communication unit configured to transmit a first indication to a UE. The first indication is used for indicating a transmission mode. The transmission mode is used for communications between the network device and the UE. The transmission mode is a first transmission mode or a second transmission mode. In the first transmission mode, the network device performs transmission in a BWP including a plurality of BWP parts, to which LBT is to be applied, after an entirety of the BWP has passed CCA. In the second transmission mode, the network device performs transmission in one or more BWP parts of the plurality of BWP parts that have passed CCA.

According to a fifth aspect of the present disclosure, a UE is provided. The UE includes: a memory having computer program stored thereon; and a processor configured to invoke and run the computer program whereby the UE is operative to perform the method according to the above first aspect.

According to a sixth aspect of the present disclosure, a chip is provided. The chip includes a processor configured to invoke and run a computer program from a memory whereby an apparatus provided with the chip is operative to perform the method according to the above first aspect.

According to a seventh aspect of the present disclosure, a computer readable storage medium is provided. The computer readable storage medium has a computer program stored thereon, and the computer program, when executed by a computer, causes the computer to perform the method according to the above first aspect.

According to an eighth aspect of the present disclosure, a computer program product is provided. The computer program product includes computer program instructions, and the computer program instructions, when executed by a computer, cause the computer to perform the method according to the above first aspect.

According to a ninth aspect of the present disclosure, a computer program is provided. The computer program, when executed by a computer, causes the computer to perform the method according to the above first aspect.

According to a tenth aspect of the present disclosure, a network device is provided. The network device includes: a memory having computer program stored thereon; and a processor configured to invoke and run the computer program whereby the network device is operative to perform the method according to the above second aspect.

According to an eleventh aspect of the present disclosure, a chip is provided. The chip includes a processor configured to invoke and run a computer program from a memory whereby an apparatus provided with the chip is operative to perform the method according to the above second aspect.

According to a twelfth aspect of the present disclosure, a computer readable storage medium is provided. The computer readable storage medium has a computer program stored thereon, and the computer program, when executed by a computer, causes the computer to perform the method according to the above second aspect.

According to a thirteenth aspect of the present disclosure, a computer program product is provided. The computer program product includes computer program instructions, and the computer program instructions, when executed by a computer, cause the computer to perform the method according to the above second aspect.

According to a fourteenth aspect of the present disclosure, a computer program is provided. The computer program, when executed by a computer, causes the computer to perform the method according to the above second aspect.

With the embodiments of the present disclosure, the network device can inform the UE of the transmission mode for use in communications between the network device and the UE, thereby facilitating the UE determining its own behaviors.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
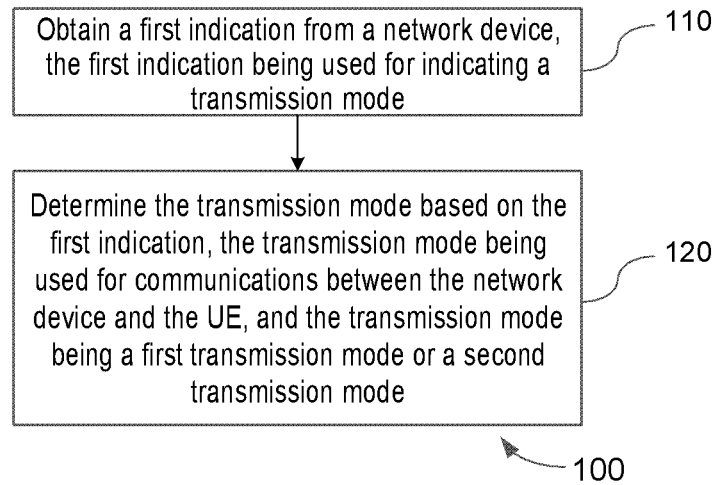
FIG. 1 is a flowchart illustrating a wireless communication method 100 applied in a UE according to embodiments of the present disclosure.

Hereinafter, the present disclosure will be described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

As used herein, the term "wireless communication network" refers to a network following any suitable communication standards, such as NR, LTE-Advanced (LTE-A), LTE, Wideband Code Division Multiple Access (WCDMA), High-Speed Packet Access (HSPA), and so on. Furthermore, the communications between a terminal device such as a User Equipment (UE) and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a UE accesses the network and receives services therefrom. The network device refers to a base station (BS), an access point (AP), or any other suitable device in the wireless communication network. The BS may be, for example, a node B (NodeB or NB), an evolved NodeB (eNodeB or eNB), or a (next) generation (gNB), a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a UE access to the wireless communication network or to provide some service to a UE that has accessed the wireless communication network.

The term "UE" refers to any end device that can access a wireless communication network and receive services therefrom. By way of example and not limitation, the UE may be, for example, a Subscriber Station (SS), a Portable Subscriber Station, a Mobile Station (MS), or an Access Terminal (AT). The UE may include, but not limited to, portable computers, desktop computers, image capture terminal devices such as digital cameras, gaming terminal devices, music storage and playback appliances, a mobile phone, a cellular phone, a smart phone, voice over IP (VoIP) phones, wireless local loop phones, tablets, personal digital assistants (PDAs), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. As used herein, a "UE" may not necessarily have a "user" in the sense of a human user who owns and/or operates the relevant device. Instead, a UE may represent a device that is intended for sale to, or operation by, a human user but that may not initially be associated with a specific human user.

As used herein, a downlink (DL) transmission refers to a transmission from a network device to a UE, and an uplink (UL) transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

According to the present disclosure, two transmission modes (also called as wideband operation modes) are defined for use in communications between the network device and the UE:

a first transmission mode, in which the network device performs transmission in a Bandwidth Part (BWP) including a plurality of BWP parts (e.g., each BWP part corresponding to a Resource Block (RB) set), to which Listen Before Talk (LBT) is to be applied (also called as an LBT bandwidth), after an entirety of the BWP has passed Clear Channel Assessment (CCA); for example, multiple BWPs are configured, a single BWP of the multiple BWPs is activated, and a gNB performs DL transmission(s) on the single BWP if CCA is successful at the gNB for the whole BWP; and a second transmission mode, in which the network device performs transmission in one or more BWP parts (e.g., one or more RB sets or one or more LBT bandwidths) contained in the BWP that have passed CCA; for example, multiple BWPs are configured, a single BWP of the multiple BWPs is activated, and the gNB performs DL transmission on parts or whole of the single BWP where CCA is successful at the gNB.

The present disclosure proposes to inform the UE which one of the first and second transmission modes is used in communications between the network device and the UE, e.g., a DL transmission between the network device and the UE, in such a manner that the UE can derive its own behaviors, e.g., how to perform reception on the DL transmission from the network device.

FIG. 1 is a flowchart illustrating a wireless communication method 100 according to embodiments of the present disclosure. The wireless communication method 100 can be performed at the UE.

At block 110, the UE obtains a first indication from a network device. For example, the first indication may be used for indicating a transmission mode for use in communications between the network device and the UE.

At block 120, the UE determines the transmission mode based on the first indication. The transmission mode may be used for communications between the network device and the UE, and may be the first transmission mode or the second transmission mode.

In an embodiment, the first indication includes a search space configuration. In this case, block 120 may be implemented by block 210 as shown in FIG. 2.

Figure 2:
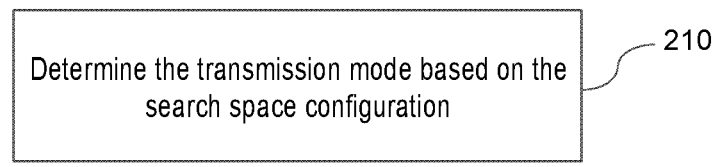
FIG. 2 shows an exemplary implementation of block 120.

FIG. 2 shows an exemplary implementation of block 120. At block 210, the UE determines the transmission mode based on the search space configuration.

Figure 3:
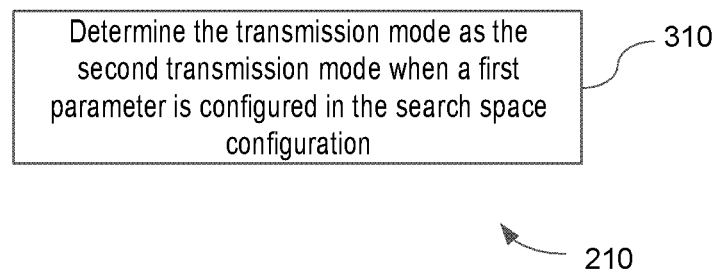
FIG. 3 shows an exemplary implementation of block 210.

FIG. 3 shows an exemplary implementation of block 210. At block 310, the UE determines the transmission mode as the second transmission mode when a first parameter is configured in the search space configuration.

Figure 4:
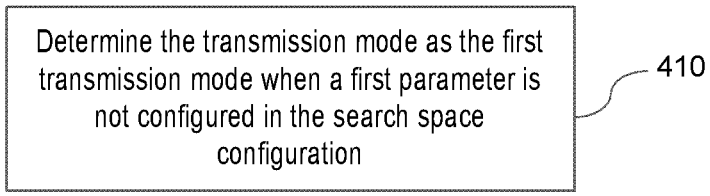
FIG. 4 shows an exemplary implementation of block 210.

FIG. 4 shows another exemplary implementation of block 210. At block 410, the UE determines the transmission mode as the first transmission mode when the first parameter is not configured in the search space configuration.

In an embodiment, the first parameter is used for indicating monitoring locations for monitoring Control-Resource Sets (CORESETs), and each of the CORESETs is confined within an individual RB set.

For example, the CORESETs may include a first CORESET confined within a first RB set and a second CORESET confined within a second RB set, and a position of the second CORESET in the second RB set depends on the first CORESET and the first RB set. In other words, the first CORESET is mapped to the second CORESET, or the second CORESET is a mirror CORESET of the first CORESET. In view of the first parameter, the UE has to monitor the first CORESET as well as its mirror CORESET (i.e., the second CORESET), which can be called as a multiple-location CORESET monitoring feature. It should be appreciated that in addition to the first and second CORESETs, the monitoring locations may be used for monitoring one or more other CORESETs, each of which is confined within an individual RB set. Then, if the multiple-location CORESET monitoring feature is enabled, the UE has to monitor the first CORESET and its one or more mirror CORESETs.

According to the present embodiment, the UE may determine the second transmission mode when the following two conditions are satisfied, one is that at least one CORESET is confined within one RB set (e.g., CORESET_confined is configured), and the other one is that the CORESET_confined associated search space configuration configures the multiple-location CORESET monitoring feature.

In an embodiment, the first parameter is freqMonitorLocations-r16. As an example, the UE may determine the transmission mode as the second transmission mode based on a presence of freqMonitorLocations-r16 in the search space configuration. As another example, the UE may determine the transmission mode as the first transmission mode based on an absence of freqMonitorLocations-r16 in the search space configuration.

In an embodiment, the first indication includes a Slot Format Indicator (SFI). In this case, block 120 may be implemented by block 510 as shown in FIG. 5.

Figure 5:
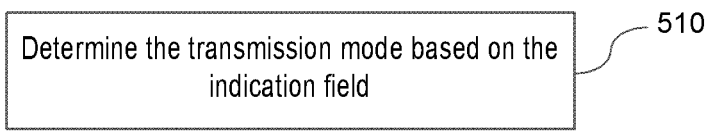
FIG. 5 shows an exemplary implementation of block 120.

FIG. 5 shows an exemplary implementation of block 120. At block 510, the UE determines the transmission mode based on the SFI.

Figure 6:
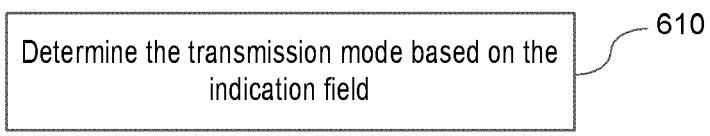
FIG. 6 shows an exemplary implementation of block 510.

In an embodiment, the SFI includes an indication field for indicating availabilities of the plurality of RB sets. In this case, block 510 may be implemented by block 610 in FIG. 6. FIG. 6 shows an exemplary implementation of block 510. At block 610, the UE determines the transmission mode based on the indication field.

Figure 7:
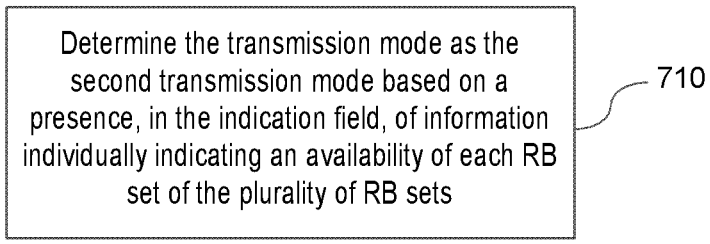
FIG. 7 shows an exemplary implementation of block 610.

FIG. 7 shows an exemplary implementation of block 610. As illustrated, block 610 may be implemented by block 710. At block 710, the UE determines the transmission mode as the second transmission mode based on a presence, in the indication field, of information individually indicating an availability of each RB set of the plurality of RB sets. As an example, such information may include a bitmap consisted of a plurality of bits, each of which indicates whether one RB set of the plurality of RB sets is available or not.

With the information individually indicating the availability of each RB set of the plurality of RB sets, in addition to determining the second transmission mode, the UE may further determine whether the corresponding RB set is available for reception, thereby determining whether to perform reception in the corresponding RB set.

Figure 8:
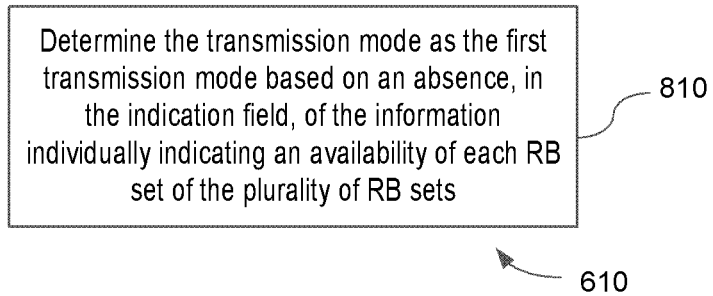
FIG. 8 shows an exemplary implementation of block 610.

FIG. 8 shows another exemplary implementation of block 610. As illustrated, block 610 may be implemented by block 810. At block 810, the UE determines the transmission mode as the first transmission mode based on an absence, in the indication field, of the information individually indicating the availability of each RB set of the plurality of RB sets.

In an embodiment, the indication field may be an available RB set indicator field. For example, the SFI may indicate the first transmission mode or the second transmission mode based on whether the available RB set indicator field contains the information individually indicating the availability of each RB set of the plurality of RB sets.

Figure 9:
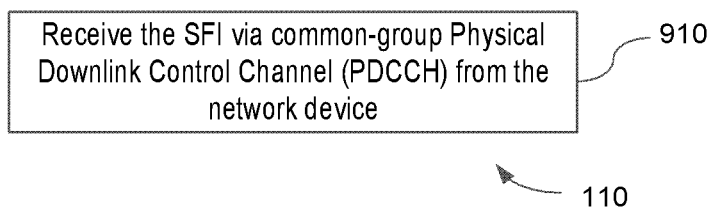
FIG. 9 shows an exemplary implementation of block 110.

FIG. 9 shows an exemplary implementation of block 110. As illustrated, block 110 may be implemented by block 910. At block 910, the UE receives the SFI via common-group Physical Downlink Control Channel (PDCCH) from the network device.

With the wireless communication method 100 according to the embodiments of the present disclosure, the UE may be informed of the transmission mode for use in communications between the network device and the UE, thereby determining its own behaviors.

Hereinafter, some examples will be explained for sake of illustration.

Example 1: Use CORESET Configuration to Derive Wideband Operation Modes

The CORESET is configured within BWP and the maximum CORESET that can be configured for a BWP is limited. Normally, CORESET can be configured to be confined within one LBT bandwidth, or alternatively, CORESET can also be configured to cross multiple LBT bandwidths. If the CORESET is confined within one LBT bandwidth, it can have an advanced feature by creating its mirror CORESET in multiple LBT bandwidth, in which each of the mirror CORESETs is also contained within the corresponding shifted LBT bandwidth. CORESET that is not confined within any of the LBT bandwidth cannot have this feature. Thus, the fact whether or not the CORESET is confined within one LBT bandwidth can be used to derive if the network wants to configure the first transmission mode or the second transmission mode.

One example is that if all the configured CORESETs are not confined within any of the LBT bandwidth, UE derives that the wideband operation mode is the first transmission mode, otherwise the wideband operation mode is the second transmission mode.

In the RRC configuration, the UE can derive the wideband operation mode based on the ControlResourceSet IE, and further the configuration parameter inside of this IE is frequencyDomainResources.

The LBT bandwidth can be derived from intraCellGuardBand-r16 and RB-RangesPerCell-r16 these two RRC parameters.

Therefore, the condition (condition 1) is that the UE needs to check if at least one CORESET is confined within one LBT bandwidth. If condition 1 is verified, UE derives the second transmission mode, otherwise the first transmission mode.

According to Example 1, the first indication may merely indicate whether there is any CORESET_confined within one RB set. Then, the UE may determine the first or second transmission mode based on such CORESET configuration.

Example 2: Use Search Space Configuration to Derive Wideband Operation Modes

In Example 1, the feature that the CORESET can be shifted from the original LBT bandwidth to the other LBT bandwidth can be controlled by the search space configuration. If the CORESET is confined within one LBT bandwidth, and its associated search space configuration can enable this feature. When this feature is enabled, the UE has to monitor the CORESET as well as its mirror CORESETs in different LBT bandwidths. This feature may be called as multiple locations CORESET monitoring feature.

One example is that if there is at least one CORESET that is configured to be confined within one LBT bandwidth (i.e., this multiple locations CORESET monitoring feature can be potentially enabled), but this feature is not enabled by the search space configuration, i.e., the UE is not configured to monitor any of the mirror CORESETs, then the UE derives that the wideband operation mode is the first transmission mode, otherwise the wideband operation mode is the second transmission mode.

In the RRC configuration, the UE can derive the wideband operation mode based on the SearchSpace IE, and further the configuration parameter inside of this IE is freqMonitorLocations-r16.

Therefore, the condition (condition 2) is that the UE needs to check if at least one CORESET (CORESET_confined) is confined within one LBT bandwidth, and the CORESET_confined associated search space configures multiple locations monitoring feature. If condition 2 is verified, UE derives the second transmission mode, otherwise the first transmission mode.

According to Example 2, the UE may determine the first or second transmission mode based on whether the multiple locations monitoring feature is enabled, i.e., whether monitoring locations for monitoring Control-Resource Sets are indicated. In this case, the UE has to monitor a CORESET_confined within one RB set as well as its mirror CORESET in a different RB set.

Example 3: Use LBT Bandwidth Availability to Derive Wideband Operation Modes

In the common-group PDCCH, the network device can provide the slot format indicator (SFI) in which the network device can further provide the LBT bandwidth availability in the wideband operation system. The information will let UE know if any LBT bandwidth does not pass LBT and is forbidden from being transmitted. Thus, this information field can be used to derive whether the first transmission mode or the second transmission mode is configured. If this information is present, it means that UE will receive an SFI indication from a certain LBT bandwidth and it tells the UE about the availability of the other LBT bandwidth. This implies the second transmission mode. In the first transmission mode case, there is no need to include this availability information because either all the LBT bandwidths are available or none of the LBT bandwidths is available, i.e., as long as the UE receives the SFI, it means all LBT bandwidths are available, otherwise none is available.

In the RRC configuration, the UE can derive the transmission mode based on the SlotFormatIndicator IE, and further the configuration parameter inside of this IE is availableLBT-BandwidthsPerCell-r16. Since an LBT bandwidth may be referred to as an RB set, to which LBT is to be applied, availableLBT-BandwidthsPerCell-r16 may be also called AvailableRB-SetsPerCell-r16.

Therefore, the condition (condition 3) is that if the LBT bandwidth availability parameter is present, the UE derives that the second transmission mode is configured, otherwise the first transmission mode is configured.

According to Example 3, the UE may determine the first or second transmission mode based on a presence or an absence, in the SFI, of information individually indicating an availability of each LBT bandwidth.

Example 4: Combination of Examples 1-3

In some cases, a network wants to have full flexibility. If the UE derives the wideband operation modes only based on examples 1-3, there might be some configuration restrictions. For example, the network device wants to use the second transmission mode, but based on example 1, the network device cannot configure any of the CORESETs that are confined in LBT bandwidth. This is a configuration restriction. In order to remove this restriction, a combination of above examples can be used, i.e., the UE checks if two conditions are verified then the UE derives the transmission mode.

One example is that if condition 2 and condition 3 are both verified, the UE derives the second transmission mode is configured, otherwise mode 1 is configured.

Any appropriate combination of the conditions, e.g., condition 1+ condition 3, condition 2+ condition 3, condition1+ condition2+ condition3, may be applied in the present disclosure.

Figure 10:
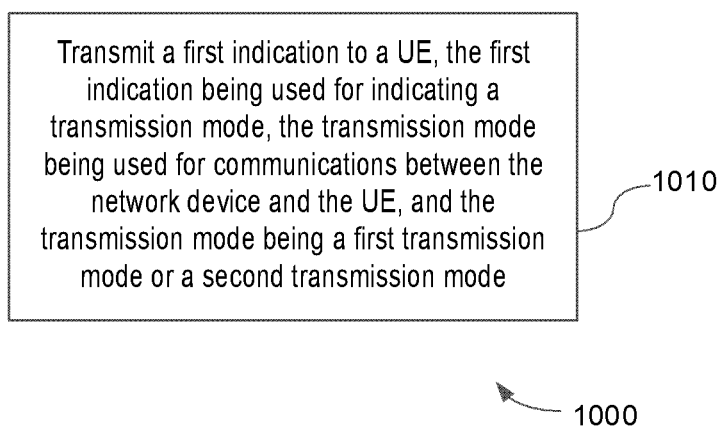
FIG. 10 is a flowchart illustrating a wireless communication method 1000 applied in a network device according to embodiments of the present disclosure.

FIG. 10 is a flowchart illustrating a wireless communication method 1000 according to embodiments of the present disclosure. The wireless communication method 1000 can be performed at a network device.

At block 1010, the network device transmits a first indication to a UE. The first indication is used for indicating a transmission mode, which is used for communications between the network device and the UE and may be the first transmission mode or the second transmission mode.

In an embodiment, the first indication includes a search space configuration for indicating the transmission mode.

In an embodiment, when a first parameter is configured in the search space configuration, the search space configuration indicates the second transmission mode.

In another embodiment, when a first parameter is not configured in the search space configuration, the search space configuration indicates the first transmission mode.

In an embodiment, the first parameter is used for indicating monitoring locations for monitoring CORESETs, each of which is confined within an individual RB set.

In an embodiment, the first parameter is freqMonitorLocations-r16. As an example, the search space configuration may indicate the second transmission mode based on a presence of freqMonitorLocations-r16 in the search space configuration. As another example, the search space configuration may indicate the first transmission mode based on an absence of freqMonitorLocations-r16 in the search space configuration.

In an embodiment, the first indication includes an SFI for indicating the transmission mode.

In an embodiment, the SFI includes an indication field for indicating availabilities of the plurality of RB sets, and the SFI indicates the transmission mode by the indication field.

As an example, the SFI indicates the second transmission mode by a presence, in the indication field, of information individually indicating an availability of each RB set of the plurality of RB sets. For example, such information may include a bitmap consisted of a plurality of bits, each of which indicates whether one RB set of the plurality of RB sets is available or not.

As another example, the SFI indicates the first transmission mode by an absence, in the indication field, of the information individually indicating the availability of each RB set of the plurality of RB sets.

In an embodiment, the indication field is an available RB set indicator field. For example, the SFI may indicate the first transmission mode or the second transmission mode based on whether the available RB set indicator field contains the information individually indicating the availability of each RB set of the plurality of RB sets.

With the information individually indicating the availability of each RB set of the plurality of RB sets, in addition to being informed of the second transmission mode, the UE may be further informed whether a corresponding RB set is available for receptions.

It should be appreciated that the wireless communication method 1000 may be applicable in the above examples 1-4.

Figure 11:
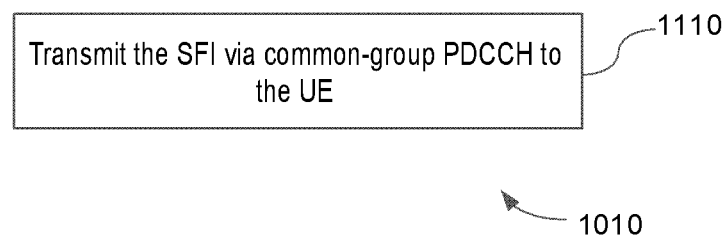
FIG. 11 shows an exemplary implementation of block 1010.

FIG. 11 shows an exemplary implementation of block 1010. As illustrated, block 1010 may be implemented by block 1110. At block 1110, the network device transmits the SFI via common-group PDCCH to the UE.

With the wireless communication method 1000 according to the embodiments of the present disclosure, the network device may inform the UE of the transmission mode for use in communications between the network device and the UE, thereby facilitating the UE determining its own behaviors.

Figure 12:
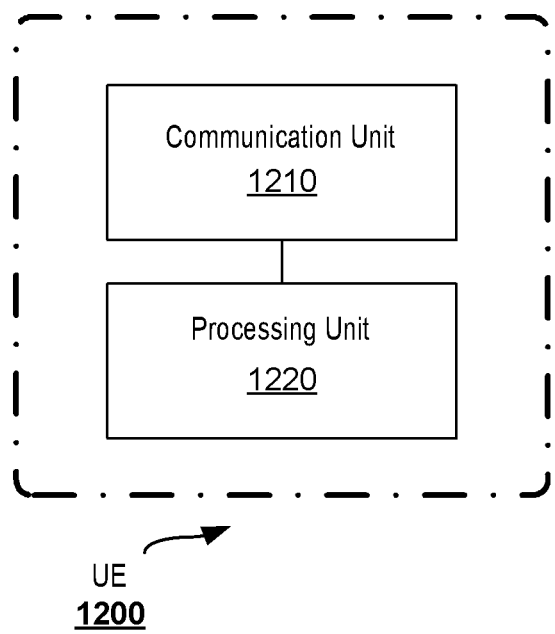
FIG. 12 is a block diagram of a UE 1200 according to an embodiment of the present disclosure.

Correspondingly to the wireless communication method 100 as described above, a UE is provided. FIG. 12 is a block diagram of a UE 1200 according to an embodiment of the present disclosure.

As shown in FIG. 12, the UE 1200 includes a communication unit 1210 and a processing unit 1220.

The communication unit 1210 is configured to obtain a first indication from a network device. The first indication is used for indicating a transmission mode.

The processing unit 1220 is configured to determine the transmission mode based on the first indication. The transmission mode is used for communications between the network device and the UE, and is a first transmission mode or a second transmission mode. In the first transmission mode, the network device performs transmission in a BWP including a plurality of BWP parts, to which LBT is to be applied, after an entirety of the BWP has passed CCA. In the second transmission mode, the network device performs transmission in one or more BWP parts of the plurality of BWP parts that have passed CCA.

In an embodiment, each of the plurality of BWP parts is an LBT bandwidth, and the LBT bandwidth is an RB set.

In an embodiment, the first indication includes a search space configuration, and the processing unit 1220 is further configured to determine the transmission mode based on the first indication by: determining the transmission mode based on the search space configuration.

In an embodiment, the processing unit 1220 is further configured to determine the transmission mode based on the search space configuration by: determining the transmission mode as the second transmission mode when a first parameter is configured in the search space configuration.

In an embodiment, the processing unit 1220 is further configured to determine the transmission mode based on the search space configuration by: determining the transmission mode as the first transmission mode when the first parameter is not configured in the search space configuration.

In an embodiment, the first parameter is used for indicating monitoring locations for monitoring CORESETs, each of which is confined within an individual RB set.

In an embodiment, the first parameter is freqMonitorLocations-r16.

In an embodiment, the first indication includes an SFI, and the processing unit 1220 is further configured to determine the transmission mode based on the first indication by: determining the transmission mode based on the SFI.

In an embodiment, the SFI includes an indication field for indicating availabilities of the plurality of RB sets, and the processing unit 1220 is further configured to determine the transmission mode based on the SFI by: determining the transmission mode based on the indication field.

As an example, the processing unit 1220 is further configured to determine the transmission mode based on the indication field by: determining the transmission mode as the second transmission mode based on a presence, in the indication field, of information individually indicating an availability of each RB set of the plurality of RB sets. For example, such information may include a bitmap consisted of a plurality of bits, each of which indicates whether one RB set of the plurality of RB sets is available or not.

As another example, the processing unit 1220 is further configured to determine the transmission mode based on the indication field by: determining the transmission mode as the first transmission mode based on an absence, in the indication field, of information individually indicating an availability of each RB set of the plurality of RB sets.

In an embodiment, the indication field is an available RB set indicator field.

In an embodiment, the communication unit 1210 is further configured to obtain the first indication from a network device by: receiving the SFI via common-group PDCCH from the network device.

In some embodiments, the processing unit 1220 can include one or more processors, and the communication unit 1210 can be a communication interface, a transceiver, a communication chip or an input-output interface of a System-on-Chip (SOC).

It should be understood that the UE 1200 according to the embodiment of the present disclosure may correspond to the UE in the wireless communication method 100 according to the embodiments of the present disclosure, and the above and other operations and/or functions of each unit in the UE 1200 are to implement the method shown in FIG. 1 as well as examples 1-4, respectively. For the sake of brevity, the corresponding process of the UE in FIG. 1 will not be repeated here.

Figure 13:
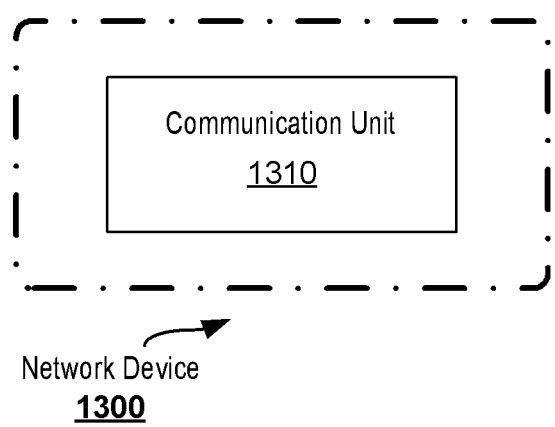
FIG. 13 is a block diagram of a network device 1300 according to an embodiment of the present disclosure.

Correspondingly to the wireless communication method 1000 as described above, a network device is provided. FIG. 13 is a block diagram of a network device 1300 according to an embodiment of the present disclosure.

As shown in FIG. 13, the network device 1300 includes a communication unit 1310.

The communication unit 1310 is configured to transmit a first indication to a UE. The first indication is used for indicating a transmission mode. The transmission mode is used for communications between the network device and the UE, and is a first transmission mode or a second transmission mode. In the first transmission mode, the network device performs transmission in a BWP including a plurality of BWP parts, to which LBT is to be applied, after an entirety of the BWP has passed CCA. In the second transmission mode, the network device performs transmission in one or more BWP parts of the plurality of BWP parts that have passed CCA.

In an embodiment, each of the plurality of BWP parts is an LBT bandwidth, and the LBT bandwidth is an RB set.

In an embodiment, the first indication includes a search space configuration for indicating the transmission mode.

In an embodiment, when a first parameter is configured in the search space configuration, the search space configuration indicates the second transmission mode.

In an embodiment, when a first parameter is not configured in the search space configuration, the search space configuration indicates the first transmission mode.

In an embodiment, the first parameter is used for indicating monitoring locations for monitoring CORESETs, each of which is confined within an individual RB set.

In an embodiment, the first parameter is freqMonitorLocations-r16.

In an embodiment, the first indication includes an SFI for indicating the transmission mode.

In an embodiment, the SFI includes an indication field for indicating availabilities of the plurality of RB sets, and the SFI indicates the transmission mode by the indication field.

As an example, the SFI indicates the second transmission mode by a presence, in the indication field, of information individually indicating an availability of each RB set of the plurality of RB sets. For example, such information may include a bitmap consisted of a plurality of bits, each of which indicates whether one RB set of the plurality of RB sets is available or not.

As another example, the SFI indicates the first transmission mode by an absence, in the indication field, of information individually indicating an availability of each RB set of the plurality of RB sets.

In an embodiment, the indication field is an available RB set indicator field.

In an embodiment, the communication unit 1310 is further configured to transmit the first indication to the UE by: transmitting the SFI via common-group PDCCH to the UE.

In some embodiments, the communication unit 1310 can be a communication interface, a transceiver, a communication chip or an input-output interface of a SOC.

It should be understood that the network device 1300 according to the embodiment of the present disclosure may correspond to the network device in the wireless communication method 1000 according to the embodiments of the present disclosure, and the above and other operations and/or functions of each unit in the network device 1300 are to implement the method shown in FIG. 10 as well as examples 1-4, respectively. For the sake of brevity, the corresponding process of the network device in FIG. 10 will not be repeated here.

Figure 14:
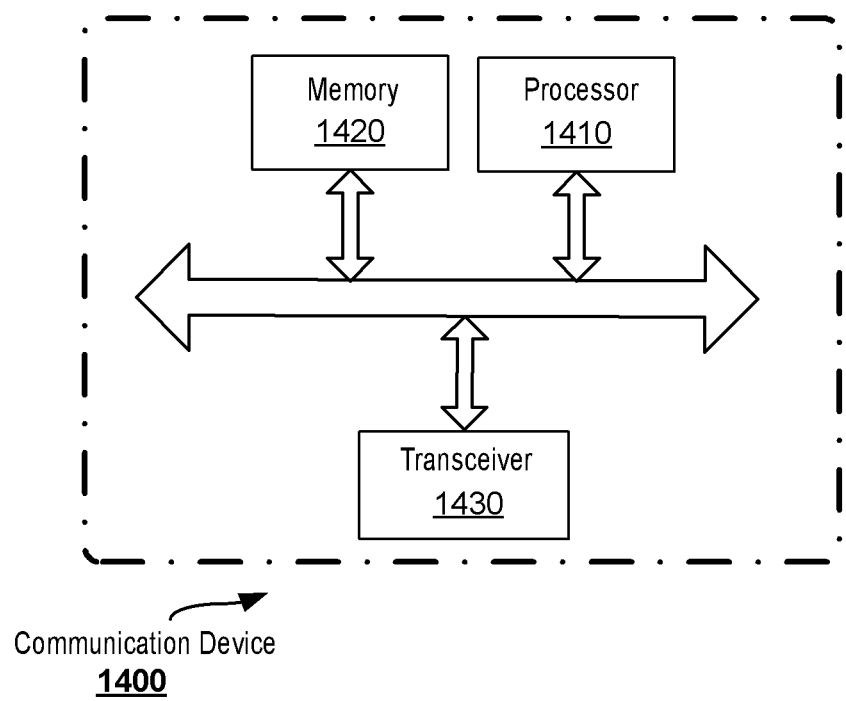
FIG. 14 is a block diagram of a communication device 1400 according to embodiments of the present disclosure.

FIG. 14 is a block diagram of a communication device 1400 according to embodiments of the present disclosure. The communication device 1400 shown in FIG. 14 includes a processor 1410, and the processor 1410 can invoke and run a computer program from a memory to implement the wireless communication method 100 or 1000 according to the embodiments of the present disclosure.

In an embodiment, as shown in FIG. 14, the communication device 1400 may further include a memory 1420. The processor 1410 may invoke and run a computer program from the memory 1420 to implement the wireless communication method 100 or 1000 according to the embodiments of the present disclosure.

The memory 1420 may be a separate device independent of the processor 1410, or may be integrated in the processor 1410.

In an embodiment, as shown in FIG. 14, the communication device 1400 may further include a transceiver 1430, and the processor 1410 may control the transceiver 1430 to communicate with other devices, e.g., transmitting information or data to other devices, or receiving information or data from other devices.

The transceiver 1430 may include a transmitter and a receiver. The transceiver 1430 may further include one or more antennas.

In an embodiment, the communication device 1400 may be a UE according to the embodiments of the present disclosure, and the communication device 1400 may implement the corresponding process implemented by the UE in the method 100 according to the embodiments of the present disclosure.

In an embodiment, the communication device 1400 may be a network device according to the embodiments of the present disclosure, and the communication device 1400 may implement the corresponding process implemented by the network device in the method 1000 according to the embodiments of the present disclosure.

Figure 15:
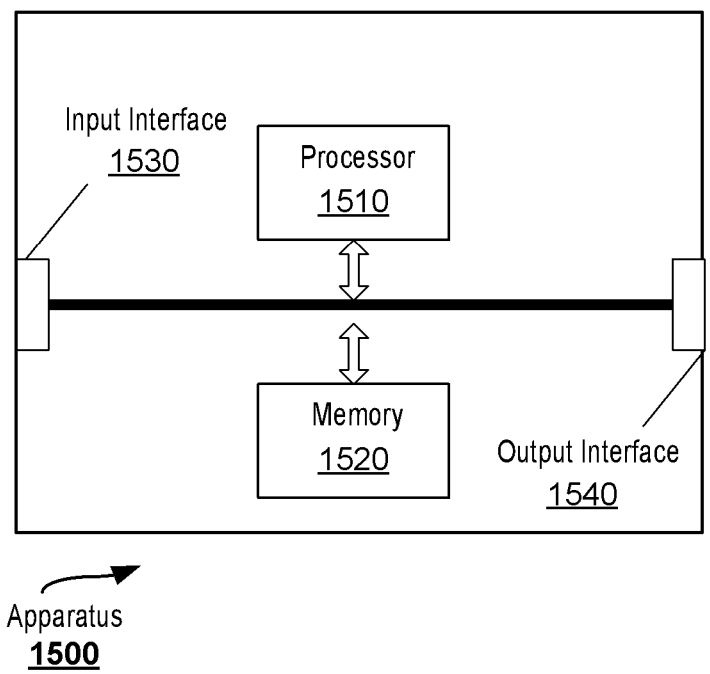
FIG. 15 is a block diagram of an apparatus 1500 according to embodiments of the present disclosure.

FIG. 15 is a block diagram of an apparatus 1500 according to embodiments of the present disclosure. The apparatus 1500 includes a processor 1510, which is configured to invoke and run a computer program from the memory to implement the wireless communication method 100 or 1000 according to the embodiments of the present disclosure.

In an embodiment, as shown in FIG. 15, the apparatus 1500 may further include a memory 1520. The processor 1510 may invoke and run a computer program from the memory 1520 to implement the wireless communication method 100 or 1000 according to the embodiments of the present disclosure.

The memory 1520 may be a separate device independent of the processor 1510, or may be integrated in the processor 1510.

In an embodiment, the apparatus 1500 may further include an input interface 1530. The processor 1510 may control the input interface 1530 to communicate with other devices or chips, e.g., obtaining information or data sent by other devices or chips.

In an embodiment, the apparatus 1500 may further include an output interface 1540. The processor 1510 can control the output interface 1540 to communicate with other devices or chips, e.g., outputting information or data to other devices or chips.

In an embodiment, the apparatus 1500 can be applied to the UE or the network device according to the embodiments of the present disclosure, and the apparatus can implement the corresponding processes implemented by the UE or the network device in each method according to the embodiments of the present disclosure.

In an embodiment, the apparatus 1500 can also be a chip. For example, the apparatus 1500 can be a system-level chip or a system-on-chip.

Figure 16:
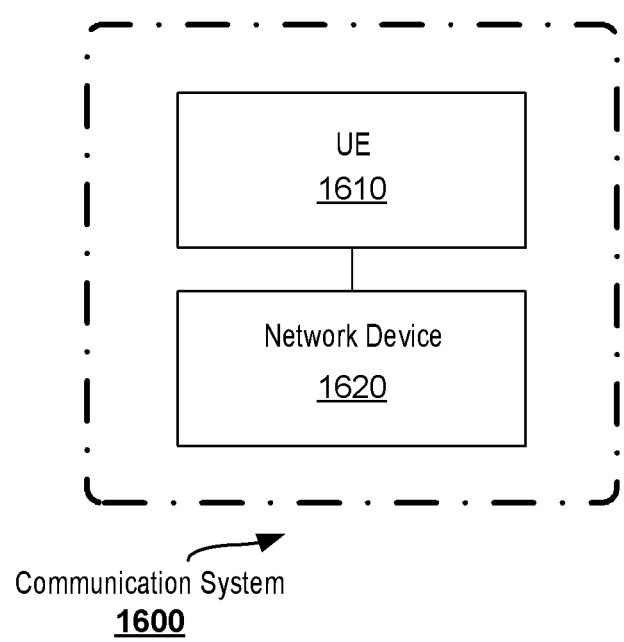
FIG. 16 is a block diagram of a communication system 1600 according to embodiments of the present disclosure.

FIG. 16 is a block diagram of a communication system 1600 according to embodiments of the present disclosure. As shown in FIG. 16, the communication system 1600 includes a UE 1610 and a network device 1620.

The UE 1610 can be used to implement the corresponding function implemented by the UE in the above method 100, and the network device 1620 can be used to implement the corresponding function implemented by the network device in the above method 1000.

It should be understood that the processor according to the embodiments of the present disclosure may be a single CPU (Central Processing Unit), but could also include two or more processing units. For example, the processor may include general purpose microprocessors; instruction set processors and/or related chips sets and/or special purpose microprocessors such as Application Specific Integrated Circuits (ASICs). The processor may also include board memory for caching purposes. The computer program may be carried by a computer program product connected to the processor. The computer program product may include a non-transitory computer readable storage medium on which the computer program is stored. For example, the computer program product may be a flash memory, a Random-Access Memory (RAM), a Read-Only Memory (ROM), or an EEPROM, and the computer program modules described above could in alternative embodiments be distributed on different computer program products in the form of memories.

The embodiments of the present disclosure also provide a computer readable storage medium having a computer program stored thereon.

In an embodiment, the computer readable storage medium can be applied to the UE or the network device according to the embodiments of the present disclosure, and the computer program causes a computer to execute the corresponding process implemented by the UE or the network device in each method according to the embodiments of the present disclosure.

The embodiments of the present disclosure also provide a computer program product including computer program instructions.

In an embodiment, the computer program product can be applied to the UE or the network device according to the embodiments of the present disclosure, and the computer program instructions cause the computer to perform the corresponding process implemented by the UE or the network device in each method according to the embodiments of the present disclosure.

The embodiment of the present disclosure also provides a computer program.

In an embodiment, the computer program can be applied to the UE or the network device according to the embodiments of the present disclosure. When executed by the computer, the computer program causes the computer to perform the corresponding process implemented by the UE or the network device in each method according to the embodiments of the present disclosure.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A wireless communication method applied in a User Equipment (UE), comprising:
    obtaining a first indication from a network device, the first indication being used for indicating a transmission mode; and
    determining the transmission mode based on the first indication, the transmission mode being used for communications between the network device and the UE, and the transmission mode being a first transmission mode or a second transmission mode,
    wherein in the first transmission mode, the network device performs transmission in a Bandwidth Part (BWP) comprising a plurality of BWP parts, to which Listen Before Talk (LBT) is to be applied, after an entirety of the BWP has passed Clear Channel Assessment (CCA), and in the second transmission mode, the network device performs transmission in one or more BWP parts of the plurality of BWP parts that have passed CCA,
    wherein each of the plurality of BWP parts is the LBT bandwidth, and the LBT bandwidth is a Resource Block (RB) set,
    the first indication comprises a search space configuration, and
    wherein said determining the transmission mode based on the first indication comprises:
    determining the transmission mode based on the search space configuration, comprising:
    determining the transmission mode as the first transmission mode when a first parameter is not configured in the search space configuration; and
    determining the transmission mode as the second transmission mode when the first parameter is configured in the search space configuration;
    wherein the first parameter is used for indicating monitoring locations for monitoring Control-Resource Sets (CORESETs), each of the CORESETs is confined within an individual RB set.

2. The wireless communication method according to claim 1,
    wherein the first indication comprises a Slot Format Indicator (SFI).

3. The wireless communication method according to claim 2,
    wherein the SFI comprises an indication field for indicating availabilities of the plurality of RB sets, and
    wherein said determining the transmission mode based on the SFI comprises:
    determining the transmission mode based on the indication field.

4. The wireless communication method according to claim 3, wherein said determining the transmission mode based on the indication field comprises:
    determining the transmission mode as the second transmission mode based on a presence, in the indication field, of information individually indicating an availability of each RB set of the plurality of RB sets; or
    determining the transmission mode as the first transmission mode based on an absence, in the indication field, of information individually indicating an availability of each RB set of the plurality of RB sets.

5. The wireless communication method according to claim 4, wherein the information individually indicating the availability of each RB set of the plurality of RB sets comprises a bitmap consisted of a plurality of bits, each of the plurality of bits indicates whether one RB set of the plurality of RB sets is available or not.

6. The wireless communication method according to claim 3, wherein the indication field is an available RB set indicator field.

7. A wireless communication method applied in a network device, comprising:
    transmitting a first indication to a User Equipment (UE), the first indication being used for indicating a transmission mode, the transmission mode being used for communications between the network device and the UE, and the transmission mode being a first transmission mode or a second transmission mode, wherein in the first transmission mode, the network device performs transmission in a Bandwidth Part (BWP) comprising a plurality of BWP parts, to which Listen Before Talk (LBT) is to be applied, after an entirety of the BWP has passed Clear Channel Assessment (CCA), and in the second transmission mode, the network device performs transmission in one or more BWP parts of the plurality of BWP parts that have passed CCA, wherein each of the plurality of BWP parts is the LBT bandwidth, and the LBT bandwidth is a Resource Block (RB) set, the first indication comprises a search space configuration for indicating the transmission mode, wherein when a first parameter is not configured in the search space configuration, the search space configuration indicates the first transmission mode; and when the first parameter is configured in the search space configuration, the search space configuration indicates the second transmission mode;

wherein the first parameter is used for indicating monitoring locations for monitoring Control-Resource Sets (CORESETs), each of the CORESETs is confined within an individual RB set.

8. The wireless communication method according to claim 7, wherein the first indication comprises a Slot Format Indicator (SFI) for indicating the transmission mode.

9. The wireless communication method according to claim 8, wherein the SFI comprises an indication field for indicating availabilities of the plurality of RB sets, and the SFI indicates the transmission mode by the indication field.

10. The wireless communication method according to claim 9, wherein
the SFI indicates the second transmission mode by a presence, in the indication field, of information individually indicating an availability of each RB set of the plurality of RB sets; or
the SFI indicates the first transmission mode by an absence, in the indication field, of information individually indicating an availability of each RB set of the plurality of RB sets.

11. The wireless communication method according to claim 10, wherein the information individually indicating the availability of each RB set of the plurality of RB sets comprises a bitmap consisted of a plurality of bits, each of the plurality of bits indicates whether one RB set of the plurality of RB sets is available or not.

12. The wireless communication method according to claim 9, wherein the indication field is an available RB set indicator field.

13. A User Equipment (UE), comprising:
a memory configured to store computer program;
a transceiver; and
a processor configured to invoke and run the computer program from the memory to perform the method of claim 1 through the transceiver.

14. A network device, comprising:
a memory configured to store computer program;
a transceiver; and
a processor configured to invoke and run the computer program from the memory to perform the method of claim 7 through the transceiver.

* * * * *